United States Patent
Fujioka

[11] 3,829,599
[45] Aug. 13, 1974

[54] DEVICE FOR INSTALLING A HOUSING OR CASE

[75] Inventor: Katsuichi Fujioka, Tokyo, Japan

[73] Assignee: Koyo Electronics Industry Co., Ltd., Tokyo, Japan

[22] Filed: Mar. 5, 1973

[21] Appl. No.: 338,387

[30] Foreign Application Priority Data
Mar. 18, 1972 Japan................ 47-32962

[52] U.S. Cl................. 174/48, 200/168 C, 248/27
[51] Int. Cl............................................. H05k 5/02
[58] Field of Search................ 174/58, 48; 248/27; 200/168 C; 220/3.6; 324/156

[56] References Cited
UNITED STATES PATENTS
1,662,422  3/1928  Hodges ........................ 200/168 C
2,514,176  7/1950  Borkowski .................... 248/27
2,741,448  4/1956  Beckwith ..................... 248/27
3,233,299  2/1966  Godel ......................... 248/27 X
3,268,190  8/1966  Hansen ....................... 248/27
3,438,603  4/1969  Van Bennekom ................. 248/27

Primary Examiner—J. V. Truhe
Assistant Examiner—David A. Tone
Attorney, Agent, or Firm—George B. Oujevolk

[57] ABSTRACT

The present invention relates to a device for readily and securely installing, on an automatic control board, a panel or the like, a case or housing herein termed a "housingcase" enclosing electronic instrument parts such as a timer, non-contact relay, counter and so on.

1 Claim, 2 Drawing Figures

PATENTED AUG 13 1974  3,829,599
FIG. 1
FIG. 2
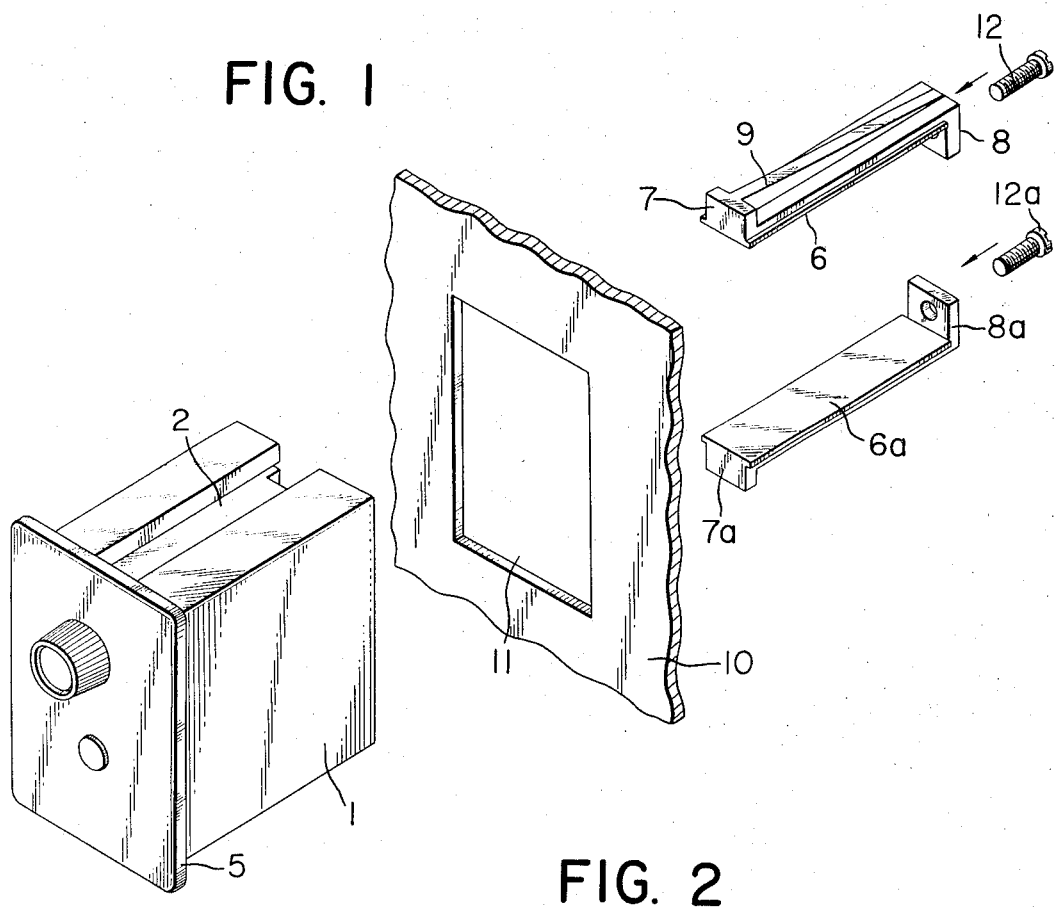
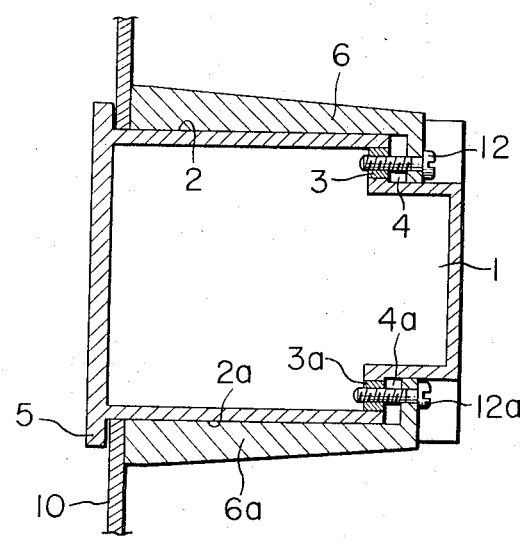

DEVICE FOR INSTALLING A HOUSING OR CASE

BACKGROUND OF THE INVENTION

In the conventional methods for the alignment installation of a housingcase on a panel, it is necessary to provide machine screw holes for the installation or bolts with each housingcases and also to form in the panel an opening for inserting the housing and holes for machine screws. Such conventional methods also involve difficulty in the installation, because it is very hard to insert hands into a narrow space between the housingcases when a great number of said housingcases are installed on a panel in abuttment. Therefore, it is necessary to leave a wider space than the required space between housingcases. The latter defect of the conventional methods is one of the factors making the installation of these articles costly due to the necessity of a large panel.

The object of the present invention is to provide a housingcase installation device adapted to fasten machine screws at the end portion of rear surface of the housingcase when said housingcase is installed on a panel.

Another object of the present invention resides in a housingcase device which makes it possible to use a smaller panel for installing a plurality of housingcases thereon compared with the panels in the prior arts.

BRIEF DESCRIPTION OF THE DRAWINGS:

FIG. 1 is an exploded perspective drawing showing an example of the device of the present invention.

FIG. 2 is a cross-sectional drawing showing how housingcases are installed on a panel.

DETAILED DESCRIPTION OF THE INVENTION:

To insert a housingcase into a panel 10, the present invention contemplates fine components: the housingcase 1, fastening plates 6, 6a, and machine screws 12, 12a.

Guide grooves 2, 2a are formed in the housingcase, which extend to the central part of the top and the bottom walls or the right and the left walls of the housingcase, and step portions 4, 4a are formed at the rear of housingcase 1 for the machine screws 12, 12a for fastening the fastening plates 6, 6a. Threaded apertures 3, 3a are also formed at an appropriate location at the rear portion of the guide grooves.

On the facing of said housingcase, a flange 5 is provided for preventing the come-off of said housingcases from said plate. On the fastening plates 6, 6a there are respectively formed, contacting faces 7, 7a at the end portions thereof, fastening faces 8, 8a at the another end portions thereof and reinforcing plates 9, 9a at the center portions thereof.

To prevent the fastening plates 6, 6a from becoming disengaged from said guide grooves 2, 2a when the machine screws 12, 12a are fastened, a groove and projection and are respectively formed on each of said guide grooves 2, 2a and fastening plates 6, 6a. Said groove and projection and are adapted to couple with each other.

When the housingcase 1 is installed on the panel 10, insertion opening 11 is formed at a desired location of the panel 10 to be installed and then the housingcase is inserted into the insertion opening 11. Then, the flange 5 of said housingcase 1 is contacted with panel 10.

The facing plates 6, 6a are respectively coupled with the guide grooves of said housingcase 1 and the contacting faces 7, 7a of said fastening plates 6, 6a are contacted with the back of panel 10. The panel 10 is firmly held between the end portion 5 of said housingcase 1 and the contacting faces 7, 7a of fastening plates 6, 6a by securing the fastening faces 8, 8a of the fastening plates 6, 6a with the threaded apertures 3, 3a of the stepped portions 4, 4a of the housingcase 1 by means of machine screws 12, 12a.

As a result of this procedures the housingcase is firmly held by the panel 10 and the installation of said housingcase has been completed.

As described hereinabove, the installation of housingcases on the panel 10 requires the making of an insertion opening for the housingcases in panel 10, whereas in the prior arts as using bolts and nuts it is required to form at not only the insertion opening for the housingcases in the panel but also holes for fastening them by means of machine screws and bolts.

The present invention further makes it possible to install housingcases and fasten machine screws at the end portion of the rear-face of each housingcase. Therefore, it is possible to perform the installation work readily and simply because one can install the housingcases on the panel without inserting the hands between the housingcases.

What is claimed is:

1. An arrangement for fastening a housing for electronic components to a panel, comprising in combination:
   a. a face panel (10) with outer and inner sides having a rectangular opening (11) sized to allow a housing of substantially rectangular cross-section to pass therethrough with little play;
   b. a box-shaped housing (1) for holding electronic components therein having pairs of opposite walls and a front and rear, a rectangular flange (5) at the front of a size larger than said opening (11) contacting said panel outer side to prevent the housing front from passing through the opening, elongated center guide grooves along the centers of each of two opposite walls extending from the front to the rear with a recessed portion in said grooves with a threaded aperture therein;
   c. elongated fastening Z-shaped plates (6) with front and rear plate pieces and a center piece, the center piece thereof being sized to fit into said grooves, the front plate piece (7) being sized and designed to contact said panel inner side, the rear plate piece (8) being sized to enter said recess and having a screw passing aperture therein corresponding to said recess threaded aperture; and,
   d. screws (12) passing through said screw passing aperture into said threaded aperture firmly holding said fastening plate to said housing (1) and forcing the front plate piece thereof against the panel inner side.

* * * * *